United States Patent [19]
Tomiyori et al.

[11] Patent Number: 5,563,495
[45] Date of Patent: Oct. 8, 1996

[54] CHARGING CIRCUIT WITH BATTERY CHARGE MONITOR CIRCUIT

[75] Inventors: Yutaka Tomiyori, Tokyo; Yukio Murata, Saitama, both of Japan

[73] Assignee: NEC Corporation, Tokyo, Japan

[21] Appl. No.: 265,037

[22] Filed: Jun. 24, 1994

[30] Foreign Application Priority Data

Jun. 28, 1993 [JP] Japan ................... 5-156489

[51] Int. Cl.$^6$ ........................... H02J 7/04
[52] U.S. Cl. ........................ 320/35; 320/39
[58] Field of Search .................. 320/35, 36, 39, 320/40, 49

[56] References Cited

U.S. PATENT DOCUMENTS

| | | | |
|---|---|---|---|
| 4,213,081 | 7/1980 | Taylor | 320/40 |
| 4,370,606 | 1/1983 | Kakumoto et al. | 320/35 |
| 4,746,854 | 5/1988 | Baker et al. | 320/40 |
| 4,918,368 | 4/1990 | Baker et al. | 320/40 |
| 5,212,439 | 5/1993 | Sano et al. | 320/39 |

FOREIGN PATENT DOCUMENTS

| | | |
|---|---|---|
| 265879 | 5/1988 | European Pat. Off. . |
| 3334851 | 4/1985 | Germany . |
| 4110453 | 10/1991 | Germany . |
| 2245781 | 1/1992 | United Kingdom . |

*Primary Examiner*—Peter S. Wong
*Assistant Examiner*—Edward Tso
*Attorney, Agent, or Firm*—Foley & Lardner

[57] ABSTRACT

A charging circuit charges a nickel-cadmium battery by means of a constant current source. A resistor, diodes and a tantalum capacitor are connected between an output terminal of the charging circuit and a ground potential. A junction between the capacitor and the diode is connected to one input terminal and an output terminal of a comparator and to the output terminal of the charging circuit. The other input terminal of the comparator is supplied with a reference potential. An output signal having a period which depends on a voltage of the battery is generated at the output terminal. The diodes compensate for a variation of the period of the output signal caused by temperature dependent capacitance change of the capacitor.

6 Claims, 3 Drawing Sheets

CHARGING CIRCUIT WITH BATTERY CHARGE MONITOR CIRCUIT

BACKGROUND OF THE INVENTION

The present invention relates to a charging circuit for a rechargeable battery and, particularly, to a battery charging circuit capable of measuring voltage of a battery such as nickel-cadmium battery regardless of temperature condition in a place where the battery is located.

The rechargeable battery such as nickel-cadmium battery has been widely used with recent popularization of portable personal computer and telephone, etc., and thus a charging circuit capable of exactly charging such a battery to a predetermined voltage level has been also popularized.

A conventional charging circuit includes a measuring circuit for equivalently measuring a charged voltage level of the battery by converting a battery voltage into a signal having a periodical waveform. The circuit for converting voltage into periodic waveform has, however, a problem that it can not measure an exact charge voltage in a location where temperature is changed largely within a short time, for reasons to be described later.

SUMMARY OF THE INVENTION

An object of the present invention is to provide a charging circuit having a battery voltage monitoring circuit capable of precisely measuring a battery voltage even if temperature thereof is changed within a short time.

The charging circuit according to the present invention comprises a constant current source for charging a battery and a comparator having a pair of input terminals and an output terminal connected to one of the input terminals. The other input terminal of the comparator is supplied with a reference voltage and an output signal whose periodicity depends upon a voltage of the battery is provided at the output terminal. A tantalum capacitor is connected between the one input terminal of the comparator and a ground potential. A resistor is inserted between an output terminal of the constant current source and the one input terminal of the comparator. A temperature compensating element is provided between the output terminal of the constant current source and the one input terminal of the comparator for compensating a variation of the periodicity of the output signal due to temperature dependent variation of a capacitance of the tantalum capacitor connected in series with the resistor.

Since the temperature compensating element such as diodes, etc., is connected in series with the resistor between the constant current source and the one input terminal of the comparator, the charging circuit of the invention can remove variation of periodicity of the output signal, which is caused by temperature dependent variation of the capacitance value of the tantalum capacitor. As a result, the charging circuit can measure the battery voltage precisely regardless of ambient temperature variation and can know when the charging of the battery is completed, exactly. Therefore, it is possible to avoid erroneous judgement of end of charging in a place which the battery is subjected to, particularly, increase of temperature.

BRIEF DESCRIPTION OF THE DRAWINGS

The above and other objects, features and advantages of the present invention will become apparent from the following detailed description when taken with the accompanying drawings, in which.

DETAILED DESCRIPTION OF THE PREFERRED EMBODIMENT

In order to assist a better understanding of the present invention, a conventional battery voltage monitor circuit will be described first with reference to FIG. 1. In this description, FIG. 2 which shows a charging characteristics of a nickel-cadmium battery and FIG. 3 which shows an output waveform of the charging circuit are also referred to.

Figure 1:
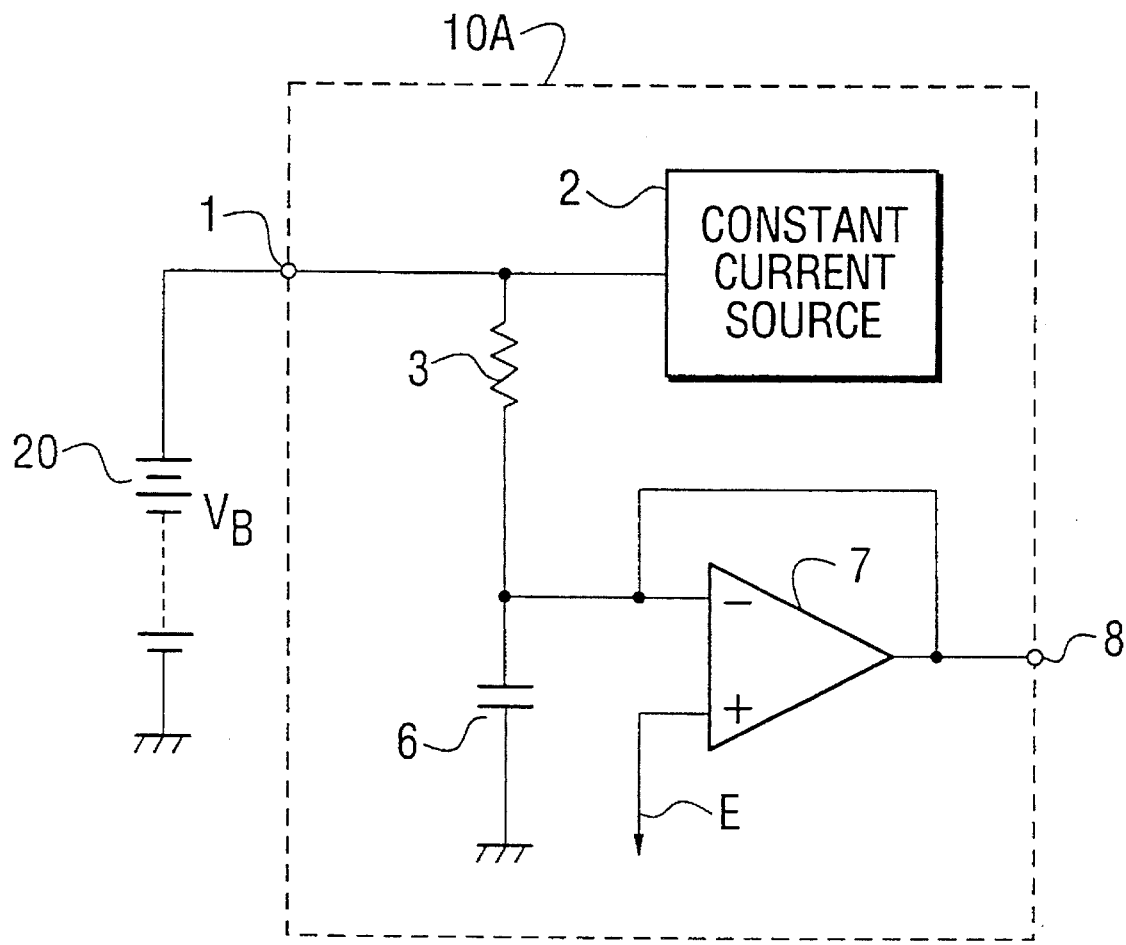
FIG. 1 is a circuit diagram of a conventional charging circuit.
Figure 2:
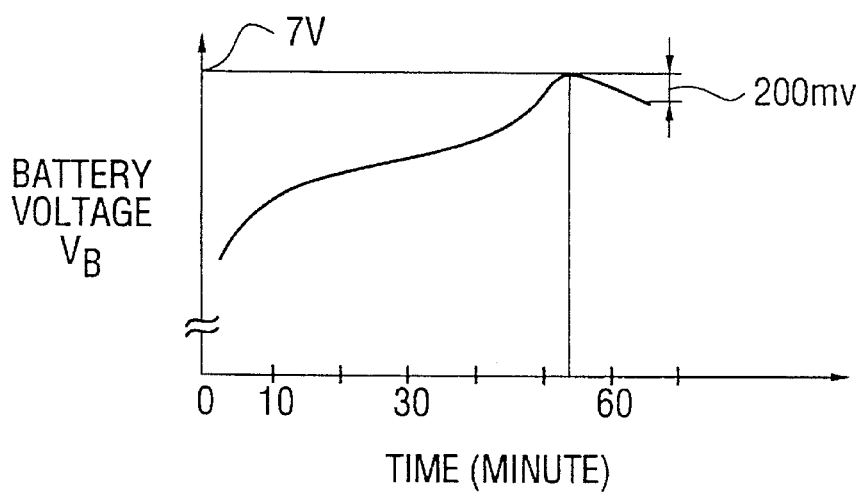
FIG. 2 is a graph showing charging characteristics of a nickel-cadmium battery.

In FIG. 1, a charging circuit 10A charges a nickel-cadmium battery 20 having a plurality of laminated cells connected to a battery connecting terminal 1 with a constant charging current I supplied from a constant current source 2. The nickel-cadmium battery 20 is completely or 100% charged in about one hour with a charging current I being 1C(A) (when a battery capacity is Q mAH, 1C=Q mA). The battery voltage Vb of the battery 20 is peaked (about 7 V when the cell number of the battery 20 is 5) immediately before a 100% charge and then starts to lower, as shown in FIG. 2. A lowering rate of the charge voltage is in the order of several mV/sec (about 0.3 mV/sec for the battery 20 having 5 cells). The charging of the battery 20 is completed after about 10 minutes of voltage lowering period measured from a time when the peak battery voltage is reached (total voltage drop of the battery voltage Vb is about 200 mV). Therefore, the charging circuit 10A detects the voltage lowering characteristics of the battery 20 to know a completion of charging and then the charging is stopped. Nickel-hydrogen battery also exhibits such voltage lowering characteristics.

An output terminal of a constant current source 10, that is, the battery connecting terminal 1 of the charging circuit 10A is connected to one end of a resistor 3. A tantalum capacitor 6 is connected between the other end of the resistor 3 and a ground potential. A connecting point between the resistor 3 and the capacitor 6 is connected to a (−) terminal of a comparator 7. The comparator 7 is of an open-collector (or open-drain) type and has an output terminal connected to the (−) input terminal thereof, as an output terminal 8 of the charging circuit 10A. A (+) terminal of the comparator 7 is supplied with a reference potential E. The comparator 7 becomes ON state and the output terminal 8 thereof becomes ground potential when a voltage Vc at the (−) terminal thereof exceeds the reference potential E at the (+) terminal thereof.

Figure 3:
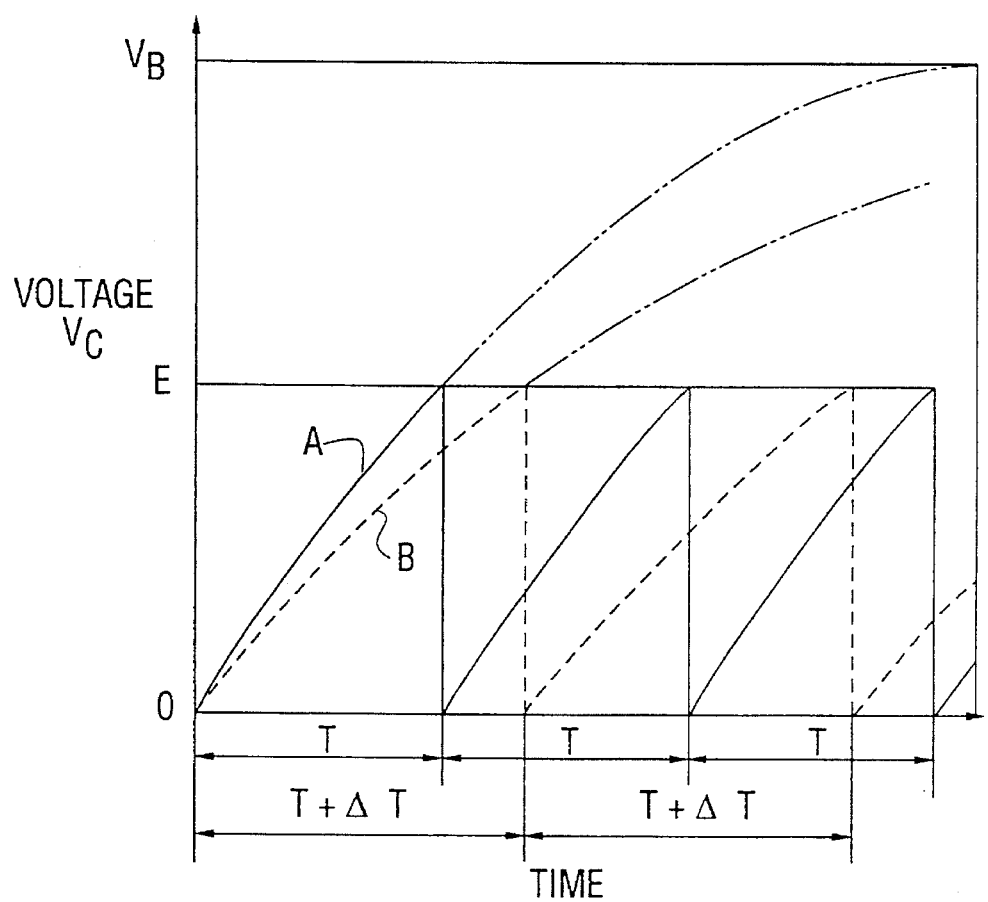
FIG. 3 shows an output signal waveform of a charging circuit.

Now, an operation of the charging circuit 10A will be described for a case where the battery voltage Vb of the nickel-cadmium battery 20 is higher than the reference potential E. Assuming, first, that a charge voltage of the capacitor 6, that is, the capacitor voltage Vc is lower than the reference potential E (time t in FIG. 3 is 0 to T), the comparator 7 is in an open state. Therefore, the capacitor 6 is charged by the constant current source 2 through the resistor 3 and the capacitor voltage Vc increases at a rate determined by the battery voltage Vb and a time constant Tc which is a product of a resistance R of the resistor 3 and a capacitance C of the capacitor 6. When a capacitor charging period T lapses and the capacitor voltage Vc exceeds the reference potential E, the output terminal of the comparator 7 becomes ground potential and charge of the capacitor 6 is quickly discharged through the comparator 7. The comparator 7 is returned to the open state after the discharge of the capacitor 6, and the capacitor 6 repeats the charge and discharge with the period T. As a result, the comparator 7 continuously outputs at the output terminal 8 thereof a ramp signal, that is, the capacitor voltage Vc having waveform A of period T as shown in FIG. 3.

The oscillation period T of the comparator 7 is substantially proportional to the time constant Tc which is the product of the resistance R of the resistor 3 and the capacitance C of the capacitor 6. When a voltage applicable to the (−) terminal of the comparator 7 is substantially higher than the reference potential E, the period T is inverse proportional to the applicable voltage, that is, the battery voltage Vb. The time constant Tc is constant under fixed condition and, therefore, by inputting the output signal of period T to a microcomputer, etc., which stores a collation table between the oscillation period T and the battery voltage Vb, the battery voltage Vb of the nickel-cadmium battery 20 can be equivalently measured easily and thus it is possible easily to know completion of the charging of the battery 20.

However, in a case where such a conventional charging circuit as mentioned above is used in a location in the vicinity of a heat generating part such as radiator in which temperature can be changed substantially within a short time, it is necessary to maintain the time constant Tc at a constant value over a wide temperature range. In general, since a temperature dependent variation of the capacitance C is larger than that of the resistance R, the conventional charging circuit 10A utilizes the tantalum capacitor 6 whose temperature dependent variation of the capacitance C is small, in order to minimize the temperature dependent variation of the time constant Tc.

Temperature dependent capacitance variation rate of even the tantalum capacitor 6 is as high as about +0.2%/° C. Therefore, when temperature of the charging circuit 10A increases from an initial temperature by 5° C., the oscillation period T of the comparator 7 is elongated by $\Delta T=0.01T$ (=1%) as shown by a ramp waveform B in FIG. 3, so that the charging circuit 10A shall measure the battery voltage Vb as a value lower than the true value by about 1%. On the other hand, the battery voltage Vb of the nickel-cadmium battery at a time when its charging is completed is about 7 V and reduction of the battery voltage Vb per 60 seconds in the vicinity of the charging completion is as small as about 20 mV which is about 0.3% of the battery voltage Vb. Therefore, when the charging circuit 10A is to be used to detect the charge completion in a place subjected to a large temperature variation, there may be an error in voltage measurement using the oscillation period T. Particularly, when a voltage measured at high temperature is used to detect the charging completion, there may be a case where a false completion of the charging is detected before actual completion of the charging.

Figure 4:
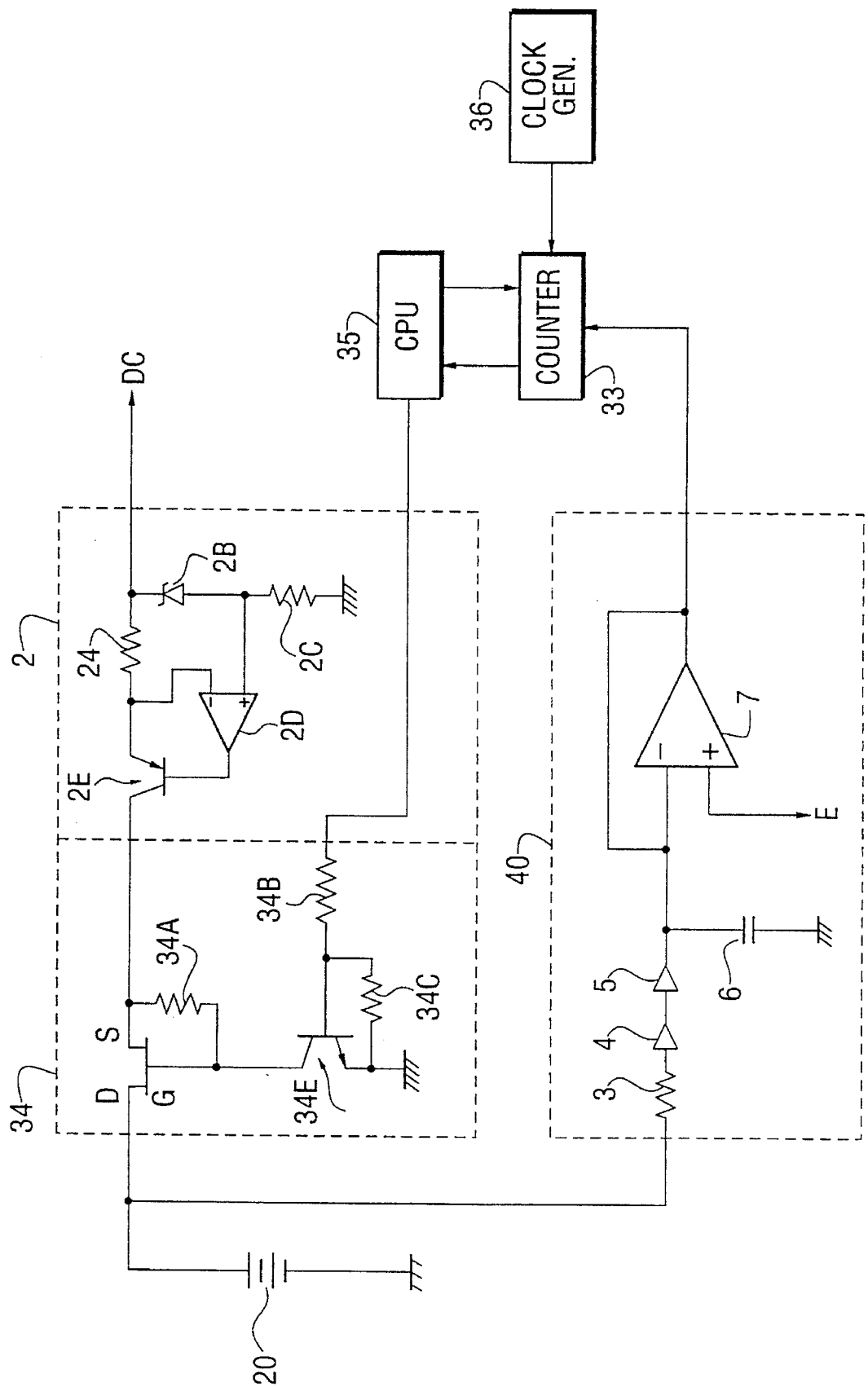
FIG. 4 is a circuit diagram of an embodiment of the present invention.

FIG. 4 is a block diagram showing a charging system using a charging state monitor circuit according to the present invention.

In FIG. 4, a constant current source 2 receives a D.C. current from a D.C. power source and supplies a charging current to a nickel-cadmium battery 20 through a switch 34. A charging state monitor circuit 40 is connected to the nickel-cadmium battery 20.

A counter 33 includes a leading edge detection circuit and a gate circuit and counts clock pulses generated from a clock generator 36 during a time period between leading edges of successive adjacent pulses of the comparator 7 to measure a period T of the output signal of the comparator 7. A CPU 35 stores a contrast table of period T and battery voltage Vb and calculates the battery voltage Vb on the basis of a measured period T supplied from the counter 33. When the CPU 35 decides that the battery voltage Vb has reached the desired charge voltage, it sends a control signal to the switch 34 to open the switch to thereby stop the charging of the battery 20.

The constant current source 2 include an operational amplifier (OP amplifier) 2D. A (−) input terminal of the OP amplifier 2D has the same potential as a (+) input terminal thereof since a negative feedback loop is formed between an emitter and a base of a transistor 2E through the OP amplifier 2D. Assume that a D.C. terminal is a reference potential, the (+) terminal has a voltage −Vz(V) which is determined by a zener voltage Vz of a zener diode 2B. The voltage of the (−) terminal becomes −Vz(V) due to the negative feedback of the OP amplifier. Therefore, a voltage drop across a resistor 2A has a voltage Vz(V), and a current of the resistor 2A having a resistance $R_A$ is expressed by $Vz/R_A$ which is constant. An output current (collector current) of the transistor also has a constant current because a base current is a negligible and determined by the collector current.

The switch 34 includes a resistors 34A and an FET 34D. When a source of the FET 34D has the same potential as that of a drain thereof, an impedance between the source and drain becomes high while it shows a low impedance when a gate has a ground potential. A transistor 34C and resistors 34B and 34C form a control circuit to determine the gate voltage of the FET 34D. A high level of a control signal given to the resistor 34B turns on the transistor 34E so that the FET 34D becomes ON state by connecting its gate to the ground. On the other hand, since the transistor 34D turns off in response to a low level of the control signal, the gate has the same potential as the source to turn off the FET 34D.

The monitor circuit 40 includes a comparator 7, a capacitor 6 and a resistor 3 which, together with the capacitor 6, ON/OFF-switches the comparator 7, as in the conventional circuit shown in FIG. 1. In addition thereto, the monitor circuit 40 includes diodes 4 and 5 which are connected in series and inserted between the resistor 3 and the comparator 7. The diodes 4 and 5 are connected to each other to supply a forward voltage to the tantalum capacitor 6 so that the capacitor 6 is charged through the diodes 4 and 5.

Where the battery 20 in this embodiment is a nickel-cadmium battery having 5 cells connected in series, the battery voltage Vb of the battery 20 is about 7 V when charging is completed. In such a case, by selecting the resistance value R of the resistor 3 such that voltage drop at each of the diodes 4 and 5 becomes about 1.0 V, the charged voltage Vc of the tantalum capacitor 6 becomes about 5 V. The reference potential E is set at about a half of the voltage Vc, that is, about 2.5 V.

With the above-mentioned parameter values, since temperature dependent forward voltage variation rate of each of the diodes 4 and 5 using germanium or silicon is generally −2.3 mV/° C., an amount of temperature dependent forward voltage variation of each of the diodes 4 and 5 around the reference potential E=2.5 V becomes $(-2.3\times10^{-3}$ V/° C.$)/2.5$ V$\neq-0.1\%/$° C. The lowering of forward voltage of the diodes increases the battery voltage Vb equivalently. More specifically, since a forward voltage of a diode has a negative characteristic with respect to the temperature increase, an output of a diode has conversely a positive characteristic to the temperature increase. Therefore, when the forward voltage lowers with the increase of the temperature, the output of the diode goes into high. In this embodiment, the battery voltage Vb is increased by +0.2%/° C. (0.1×2) equivalently by the diodes 4 and 5. The equivalent temperature dependent variation of the battery voltage Vb is the same in direction and substantially the same in magnitude as the variation of temperature dependent capacitance variation rate +0.2%/° C. of the tantalum capacitor 6.

Oscillation period T of the comparator 7 is proportional to the time constant Tc which is the product of the resistance R of the resistor 3 and the capacitance C of the tantalum capacitor 6. When the voltage applicable to the (−) terminal of the comparator 7 is substantially larger than the reference potential E, the period T is substantially in inverse proportion to the applicable voltage, that is, the battery voltage Vb. Therefore, the forward voltage change of the diodes 4 and 5 compensates for the variation of oscillation period T due to change of the capacitance of the tantalum capacitor 6 caused by temperature change. As mentioned above, this charging circuit can measure the battery voltage Vb of the battery 20 precisely since the oscillation period T of the output signal at the output terminal thereof does not change even if it is disposed in a place where temperature varies considerably.

It should be noted that, in the present charging circuit, the reference potential E, the kind of capacitor and the number of the temperature compensating diodes 4 and 5 are not limited to those shown in FIG. 4 and can be suitably selected, together with the resistance R of the resistor 3 and the capacitance C of the capacitor 6, correspondingly to a desired measuring accuracy of the battery voltage Vb.

Although, in the charging circuit, the variation of the time constant Tc due to temperature dependent change of the capacitance of the tantalum capacitor 6 is compensated by means of the forward voltage change of the diodes 4 and 5, the temperature compensating circuit for the present charging circuit is not limited to that described. That is, it is possible to compensate for the variation of the time constant Tc due to temperature dependent capacitance variation of the tantalum capacitor 6 by another means so that the oscillation period T of the output signal is kept constant regardless of temperature. For example, when a resistance circuit including a thermistor which has a negative temperature dependent resistance variation is used instead of the diodes 4 and 5 shown in FIG. 4, a sum of the resistance R of the resistor 3 and a resistance of the resistance circuit including the thermistor exhibits a negative temperature dependent resistance variation. Since the change of the resistance of the sum is in a direction in which the temperature dependent capacitance variation of the tantalum capacitor 6 is cancelled out, it is possible to reduce the temperature dependent change of the oscillation period T.

What is claimed is:

1. A charging circuit comprising:

a constant current source for supplying a constant current for charging a battery;

a comparator having one input terminal, the other input terminal supplied with a reference potential and an output terminal connected to said one input terminal for generating an output signal having a period dependent upon a voltage of said battery;

a capacitor connected between said one input terminal of said comparator and a ground potential;

a resistor inserted between an output terminal of said constant current source and said one input terminal of said comparator; and a temperature compensating element connected in series with said resistor between said output terminal of said constant current source and said one input terminal of said comparator for compensating for a variation of period of the output signal caused by temperature dependent change of capacitance of said capacitor.

2. The charging circuit claimed in claim 1, wherein said temperature compensating element comprises a forward biased diode.

3. The charging circuit claimed in claim 1, wherein said capacitor comprises a tantalum capacitor.

4. The charging circuit claimed in claim 1, further comprising period measuring means for measuring the period of the output signal of said comparator, means for outputting a charge completion signal when the measured period corresponds to a predetermined period and means responsive to the charge completion signal to terminate the charging of said battery.

5. A battery charge monitor circuit comprising:

a comparator having one input terminal, the other input terminal supplied with a reference potential and an output terminal connected to said one input terminal for generating an output signal having a period dependent upon a voltage of a battery which is charged;

a capacitor connected between said one input terminal of said comparator and a ground potential;

a resistor inserted between an output terminal of a constant current source and said one input terminal of said comparator;

a temperature compensating element connected in series with said resistor between said output terminal of said constant current source and said one input terminal of said comparator for compensating for a variation of period of the output signal caused by temperature dependent change of capacitance of said capacitor; and monitor means for monitoring the output of said comparator.

6. The battery charge monitor circuit claimed in claim 5, wherein said monitor means comprises period measuring means for measuring the period of the output signal of said comparator, means for outputting a charge completion signal when the measured period corresponds to a predetermined period and means responsive to the charge completion signal to terminate the charging of said battery.

* * * * *